(12) United States Patent
Suyama

(10) Patent No.: US 8,111,601 B2
(45) Date of Patent: Feb. 7, 2012

(54) METHOD OF FORMING VISUAL IMAGE ON OPTICAL DISK BY LASER BEAM

(75) Inventor: Akihiko Suyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/487,604

(22) Filed: Jun. 18, 2009

(65) Prior Publication Data

US 2009/0251525 A1  Oct. 8, 2009

Related U.S. Application Data

(62) Division of application No. 10/608,712, filed on Jun. 26, 2003, now abandoned.

(30) Foreign Application Priority Data

Jun. 28, 2002 (JP) ................................. 2002-191161

(51) Int. Cl.
G11B 7/00 (2006.01)

(52) U.S. Cl. .................................. 369/59.23; 369/275.4

(58) Field of Classification Search ................. 369/59.23
See application file for complete search history.

(56) References Cited

U.S. PATENT DOCUMENTS

| | | |
|---|---|---|
| 4,961,077 A | 10/1990 | Wilson et al. |
| 5,281,797 A | 1/1994 | Tatsuno et al. |
| 5,809,003 A | 9/1998 | Taira et al. |
| 5,956,311 A | 9/1999 | Kawai |
| 6,490,239 B1 | 12/2002 | Nagasaka |
| 6,521,318 B1 | 2/2003 | Li |
| 6,556,234 B1 | 4/2003 | Koyama |
| 6,735,166 B1 | 5/2004 | Kusafuka et al. |
| 8,018,824 B2 | 9/2011 | Tsurumi et al. |
| 2001/0026531 A1 | 10/2001 | Onodera et al. |
| 2001/0040867 A1 | 11/2001 | Onodera et al. |
| 2003/0058771 A1 | 3/2003 | Furukawa et al. |

(Continued)

FOREIGN PATENT DOCUMENTS

EP  1 049 079 A1  11/2000

(Continued)

OTHER PUBLICATIONS

European Search Report mailed Sep. 28, 2007, for EP Application No. 03014841.5, four pages.

(Continued)

*Primary Examiner* — Van Chow
(74) *Attorney, Agent, or Firm* — Morrison & Foerster LLP

(57) ABSTRACT

A method is designed for forming a visual image having a specified shape on a surface of an optical disk by using an optical writing process of irradiating a laser beam onto the surface of the optical disk to form pits. The optical disk is normally capable of recording information on the surface thereof by the optical writing process. The method is carried out by the steps of acquiring image formation information associated to a visual image to be formed, forming the visual image on the surface of the optical disk based on the acquired image formation information by using the optical writing process, and recording the image formation information together with the formed visual image on the surface of the same optical disk. The image formation information contains start address information specifying a position of the surface of the optical disk to start the optical writing process for forming the visual image, stop address information specifying another position to stop the optical writing process, and pattern information specifying a pattern of irradiating the laser beam during the optical writing process.

4 Claims, 13 Drawing Sheets

U.S. PATENT DOCUMENTS

| | | |
|---|---|---|
| 2004/0001413 A1 | 1/2004 | Suyama |
| 2004/0125730 A1 | 7/2004 | Yamamoto |

FOREIGN PATENT DOCUMENTS

| | | |
|---|---|---|
| EP | 1143426 | 10/2001 |
| EP | 1 274 084 A2 | 1/2003 |
| JP | 4255962 | 9/1992 |
| JP | 06-267073 | 9/1994 |
| JP | 9-73666 | 3/1997 |
| JP | 11-134648 | 5/1999 |
| JP | 2000-090501 A | 3/2000 |
| JP | 2001-118289 | 4/2001 |
| JP | 2002-133661 | 5/2002 |
| JP | 2002-367173 | 12/2002 |
| JP | 2002-367173 A | 12/2002 |
| JP | 2003-051118 | 2/2003 |
| JP | 2003-051118 A | 2/2003 |

OTHER PUBLICATIONS

European Search Report mailed Aug. 1, 2008, for EP Application No. 03014841.5, five pages.

Notification of Rejection mailed Nov. 1, 2005, for JP Application No. 2002-191161, with English Translation, five pages.

Notification of Rejection mailed May 2, 2006, for JP Application No. 2002-191161, with English Translation, four pages.

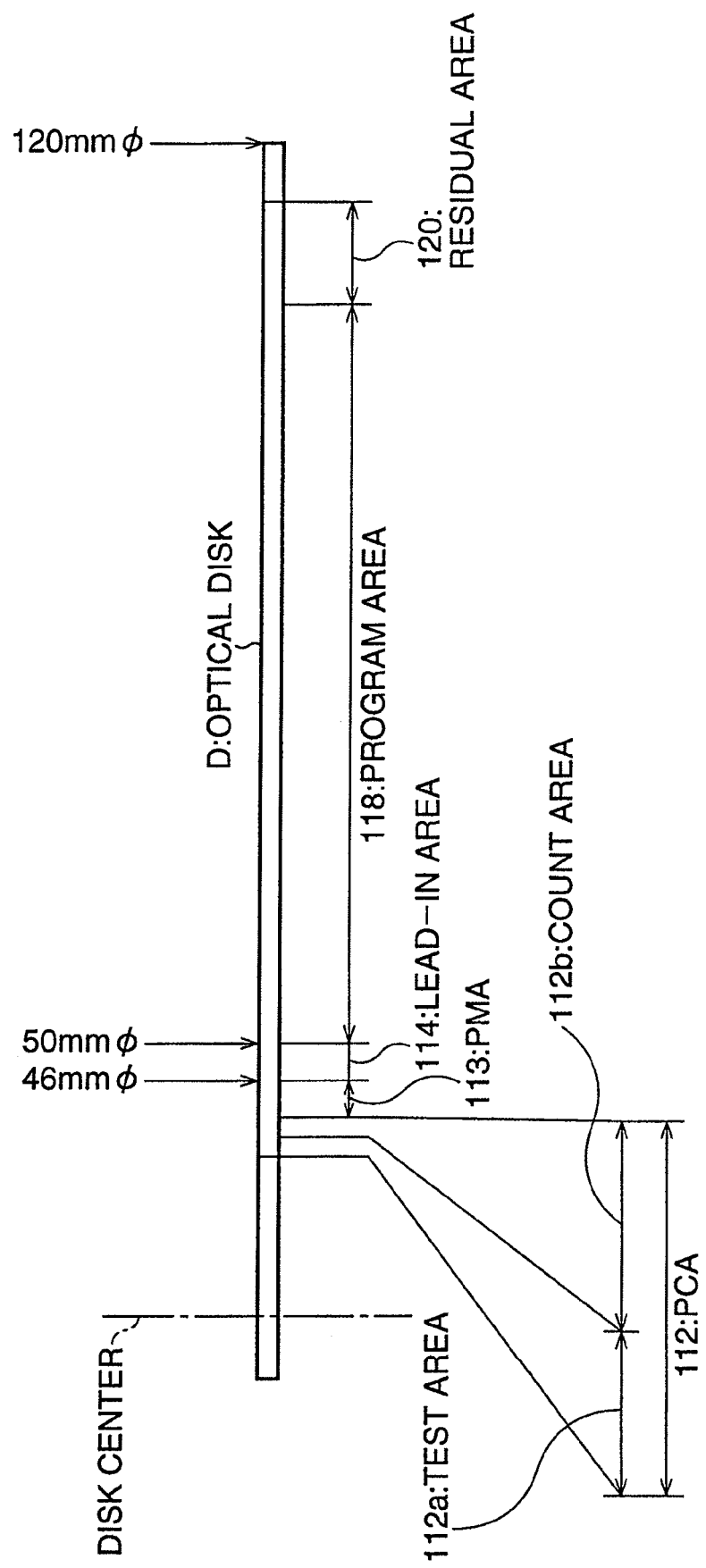

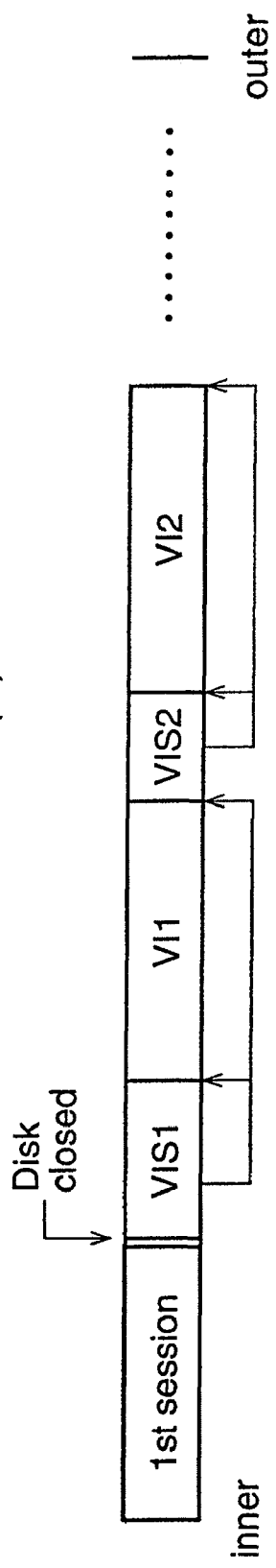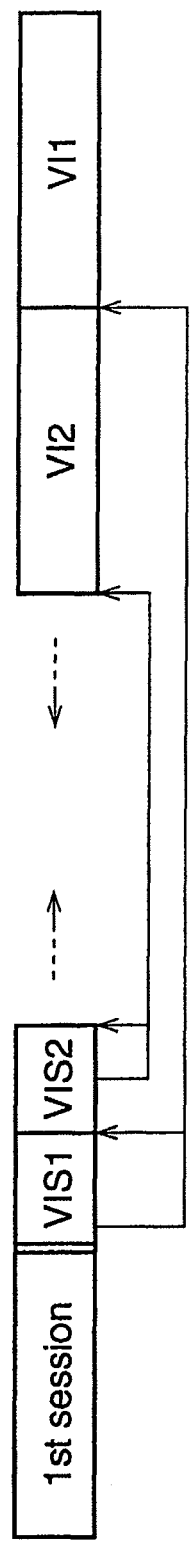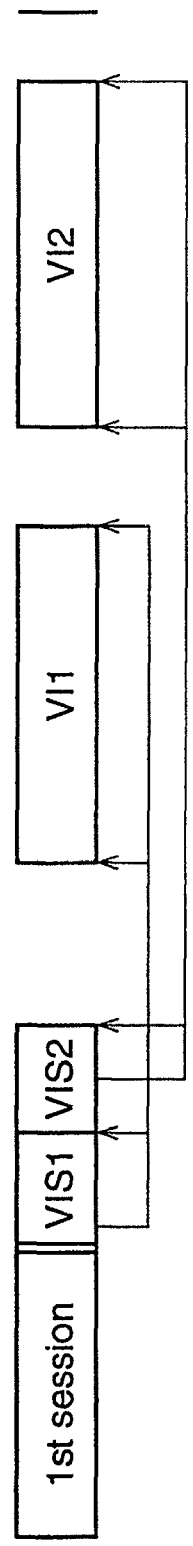

METHOD OF FORMING VISUAL IMAGE ON OPTICAL DISK BY LASER BEAM

CROSS-REFERENCE TO RELATED APPLICATIONS

This is a division of U.S. patent application Ser. No. 10/608,712, filed Jun. 26, 2003, the entire disclosure of which is incorporated by reference herein.

BACKGROUND OF THE INVENTION

1. Technical Field of the Invention

The present invention relates to an optical disk recording method, an optical disk recording program, and an optical disk recording apparatus for forming, adding, and duplicating a visual image on a data recording surface of a recordable optical disk.

2. Prior Art

A recordable optical disk can optically record data through irradiation of a laser beam. These recordable optical disks include write-once-read-many optical disks such as CD-R and DVD-R capable of recording data only once, and rewritable optical disks such as CD-RW, DVD-RW, DVD+RW and DVD-RAM capable of rewriting data.

When a laser beam is irradiated to an organic dye layer (recording layer) of a write-once-read-many optical disk, the laser beam melts the organic dye layer to form a pit. Using this characteristic, the write-once-read-many optical disk records data. When a laser beam is irradiated to a recording layer of a rewritable optical disk, the laser beam changes the recording layer between an amorphous (non-crystalline) state and a crystalline state corresponding to a pit and a land. Using this characteristic, the rewritable optical disk records data.

In this manner, the recordable optical disk forms a pit where the laser beam is irradiated to record data. A location where data is recorded and a location where no data is recorded cause different light reflectance, and therefore cause dark and bright coloring on the recording surface. Using this characteristic, it is possible to draw characters, symbols, pictures, and photos as a visually recognizable image (hereafter referred to as a visual image) by irradiating a laser beam onto a data recording surface of the recordable optical disk. For example, if title information of recorded data is indicated as a visual image on the data recording surface of the recordable optical disk, it becomes unnecessary to handwrite or print the title information of recorded data on the optical disk's label surface. In addition, it is possible to easily identify the recording contents of the optical disk by the formed visual image.

A conventional optical disk recording apparatus forms visual images on a recordable optical disk in the following procedure.

1. When an optical disk is mounted, the optical disk recording apparatus first checks whether or not data can be recorded physically. That is to say, it is determined whether the mounted optical disk is a read-only optical disk such as CD-DA and CD-ROM or is a recordable optical disk such as CD-R and CD-RW.

2. When the read-only optical disk is mounted, the optical disk recording apparatus stops a visual image formation process. When the recordable optical disk is mounted, the optical disk recording apparatus accesses TOC (Table Of Contents) information or temporary TOC information in a PMA (Program Memory Area) to obtain the end position of a data area. If a blank disk is mounted, i.e., an optical disk having neither the TOC information nor temporary TOC information, the optical disk recording apparatus stops a visual image formation process.

3. If the optical disk is capable of forming visual images, the optical disk recording apparatus edits or converts an image to be formed as a visual image automatically or in accordance with a user instruction.

4. When a user issues an instruction to form a visual image on the optical disk, the optical disk recording apparatus forms the visual image on an unused area after the end of the area where data is recorded. At this time, the optical disk recording apparatus forms the visual image as a visibly recognizable image, not as data capable of being read later such as an RF signal modulated on the basis of EFM (Eight to Fourteen Modulation).

5. When another visual image is to be formed on another recordable optical disk, the optical disk recording apparatus performs the above-mentioned processes 1 to 4 without saving data (original data or write data) concerning the visual image most recently formed on the optical disk.

There have been the following problems on the conventional optical disk recording apparatus that forms a visual image on the recordable optical disk according to the above-mentioned procedure.

(1) The conventional optical disk recording apparatus can form a visual image on only a recordable optical disk accessible for adding data, i.e., a recordable optical disk not in the disk-close state. Further, the optical disk that forms a visual image does not record information about a range of visual image formation. When a visual image is formed and another data is added to an optical disk that is not in the disk-close state, another data may be overwritten to the already formed visual image. Since the optical disk does not record the information about a range of visual image formation as mentioned above, the optical disk recording apparatus cannot recognize the range of visual image formation. Data may be recorded to an area where the visual image is formed depending on the amount of recorded data or a position of the formed visual image. In this case, the visual image overlaps with the recorded data, making it impossible to read an overlapped portion of the recorded data.

(2) The conventional optical disk recording apparatus cannot form a visual image on a blank disk where no TOC information or temporary TOC information is recorded. In order to form a visual image on a blank disk, a user needs to record any data before forming the visual image in order to make the disk accessible.

(3) The conventional optical disk recording apparatus creates data for visual images each time a visual image is created without saving original data or write data for the visual image. The same visual image cannot be formed on another optical disk exactly.

(4) The conventional optical disk recording apparatus records a visual image as an EFM-modulated RF signal such as music data and computer data. It has been impossible to read the visual image formed on the optical disk. Since the visual image is not recognized as data, the visual image cannot be duplicated from one optical disk to another.

(5) When a visual image is formed on the optical disk, the conventional optical disk recording apparatus does not record information about a range of visual image formation. Once the visual image is formed, it may be impossible to reliably add another visual image without overlap with the already formed visual image, even if there remains an unused area on the optical disk where the visual image is formed. Normally, the conventional optical disk recording apparatus can form a visual image on the optical disk just only once.

SUMMARY OF THE INVENTION

The present invention has been made in order to solve these problems. It is therefore an object of the present invention to provide an optical disk recording method, an optical disk recording program, and an optical disk recording apparatus that can form, add, and duplicate one or more visual images on any recordable optical disk having an area capable of forming a visual image.

The present invention provides the following configurations as means for solving the above-mentioned problems.

(1) The present invention provides a method of forming a visual image having a specified shape on a surface of an optical disk by using an optical writing process of irradiating a laser beam onto the surface of the optical disk to form pits. The optical disk is capable of recording information on the surface thereof by the optical writing process. The method comprises the steps of checking a recording state of an optical disk to confirm that the optical disk is left unrecorded or is capable of additionally recording information, placing the optical disk in a recording end state while an available area is left on the surface of the optical disk, so that the optical disk is made unable to additionally record information on the available area any more, and forming the visual image in the available area of the optical disk by using the optical writing process.

In this configuration, the optical disk is allowed to be completed for recording and disabled for additional writing, and then a visual image is formed in an unused area of the optical disk. After the visual image is recorded, further music data or computer data cannot be recorded. The visual image here refers to a visually recognizable image having any specified shape such as characters, symbols, pictures, and photos formed on a recordable optical disk according to the following characteristic. When a laser beam is irradiated onto the recordable optical disk to form a pit, a location where the pit is formed and a location where no pit is formed cause different light reflectance, and therefore cause dark and bright coloring.

Accordingly, it is possible to prevent another data from being inadvertently overwritten to the visual image. When the visual image is to be formed on a blank optical disk, it becomes possible to automatically record a dummy session, close the disk, and then form the visual image.

(2) The present invention provides a method of forming a visual image having a specified shape on a surface of an optical disk by using an optical writing process of irradiating a laser beam onto the surface of the optical disk to form pits. The optical disk is capable of recording information on the surface thereof by the optical writing process. The method comprises the steps of acquiring image formation information associated to a visual image to be formed, forming the visual image on the surface of the optical disk based on the acquired image formation information by using the optical writing process, and recording the image formation information together with the formed visual image on the surface of the same optical disk by using the optical writing process.

In this configuration, the data recording surface of the optical disk is formed with a visual image and visual image formation information (to be described in more detail in paragraphs (5) to (7) below) used for forming the visual image on the data recording surface of the optical disk. Since the visual image formed on the optical disk is not recorded in an EFM signal, it is difficult to duplicate the visual image as is on another optical disk. When the visual image is formed on the optical disk, however, the visual image formation information is recorded simultaneously. Accordingly, it is possible to duplicate the visual image onto another optical disk based on the visual image formation information that is recorded on the original optical disk.

(3) The inventive method further comprises the step of placing the optical disk in a recording end state after the image formation information is recorded so that the optical disk is made unable to additionally record information any more.

When a visual image is formed on the optical disk according to this configuration, the visual image formation information is also recorded, and then the optical disk is allowed to be completed for recording and disabled for additional writing. Accordingly, the visual image formation information can be recorded and read as ordinary data.

(4) The inventive method further comprises the step of placing the optical disk in a recording end state while leaving a reserved area on the surface of the optical disk so that the optical disk is made unable to additionally record information except for the reserved area, wherein the step of recording records the image formation information in the reserved area after the optical disk is placed in the recording end state.

When a visual image is formed on the optical disk according to this configuration, the optical disk is allowed to be completed for recording and disabled for additional writing, and then the visual image formation information is recorded in a reserved area of the optical disk. Accordingly, the visual image formation information cannot be read by an ordinary optical disk recording and reproducing apparatus and can be used as hidden information. In addition, only a special optical disk recording apparatus accessible to the hidden area can read the visual image formation information recorded on the optical disk for reproducing a visual image.

(5) In the inventive method, the step of recording records the image formation information containing start address information specifying a position of the surface of the optical disk to start the optical writing process for forming the visual image, stop address information specifying another position to stop the optical writing process for forming the visual image, and pattern information specifying a pattern of irradiating the laser beam during the optical writing process for forming the visual image.

According to this configuration, the optical disk records information about a position to start forming the visual image, information about a position to stop forming the visual image, and laser beam irradiation pattern information for visual image formation as the visual image formation information. This makes clear a range of visual image formation from the formation start position to the formation end position. A plurality of visual images can be formed without overlap. After the visual image is formed on an optical disk that is not in the recording end state, further data may be recorded on this disk. In such case, it is possible to confirm a range of visual image formation. The additional data can be recorded without overlap with the already formed visual image. Further, there is provided the laser beam irradiation pattern for visual image formation. It is possible to readily form the visual image without converting original image data for the visual image.

(6) In the inventive method, the step of recording records the image formation information containing image data which represents the visual image and which is recorded in a format readily readable from the optical disk for reproduction of the visual image on a display.

According to this configuration, image data for the visual image is recorded in a file format appropriate for display on the screen. The optical disk records that image data as the visual image formation information. When image data is saved in a file format appropriate for display on the screen, that file format is used for saving image data according to the orthogonal coordinate system or the vector system that is appropriate for display on the screen of a personal computer's display apparatus, and the like. For example, available file formats for image data include bmp, gif, jpg, tif, pct, and dxf. Accordingly, the visual image information can be readily displayed on an optical disk recording apparatus.

(7) In the inventive method, the step of recording is capable of consecutively recording a plurality of image formation information corresponding to a plurality of visual images, such that each image formation information contains address information which specifies a start address of next image formation information or specifies a reserved area for next image formation information.

According to this configuration, the optical disk records, as the visual image formation information, the start position information about the next visual image formation information or the position information able to start recording the next visual image formation information. Accordingly, the visual image formation information can be recorded without overlap. When the optical disk records a plurality of visual image formation information, each visual image formation information can be read sequentially.

(8) In the inventive method, the step of recording is capable of recording a plurality of image formation information corresponding to a plurality of visual images, so that the step of forming can successively form the plurality of the visual images on the surface of the optical disk without overlapping with each other based on the plurality of the recorded image formation information.

According to this configuration, the visual image is formed on the basis of the visual image formation information that is created so as not to cause an overlap in the range of visual image formation from the formation start position to the formation end position. Consequently, a plurality of visual images can be formed without overlap on the optical disk.

(9) The present invention provides a method applicable when duplicating an original optical disk for forming a visual image on a surface of a duplicate optical disk by using an optical writing process of irradiating a laser beam onto the surface of the duplicate optical disk to form pits. The method comprises the steps of acquiring image formation information useable for forming a visual image, embedding the acquired image formation information on a surface of the original optical disk, copying the image formation information embedded in the origin optical disk to the duplicate optical disk by using the optical writing process; and reproducing the visual image on the surface of the duplicate optical disk by using the optical writing process based on the copied image formation information.

According to this configuration, after the visual image formation information is duplicated to a duplication destination optical disk, the visual image is formed on the duplication destination optical disk based on the visual image formation information. Therefore, it is possible to form almost the same visual image on the duplication destination optical disk as the visual image formed on the duplication origin optical disk. Even if only the visual image formation information is recorded on the duplication origin optical disk, a visual image can be formed on a duplication destination optical disk by reading the visual image formation information. This makes it possible to easily check if any optical disk is original or duplicated. The optical disk can be used for advertisement and the like.

BRIEF DESCRIPTION OF THE DRAWINGS

FIG. 2 is a sectional view showing an area configuration of optical disk.

FIGS. 11(A), 11(B) and 11(C) show a data configuration when a plurality of visual images are formed.

DETAILED DESCRIPTION OF THE INVENTION

Figure 1:
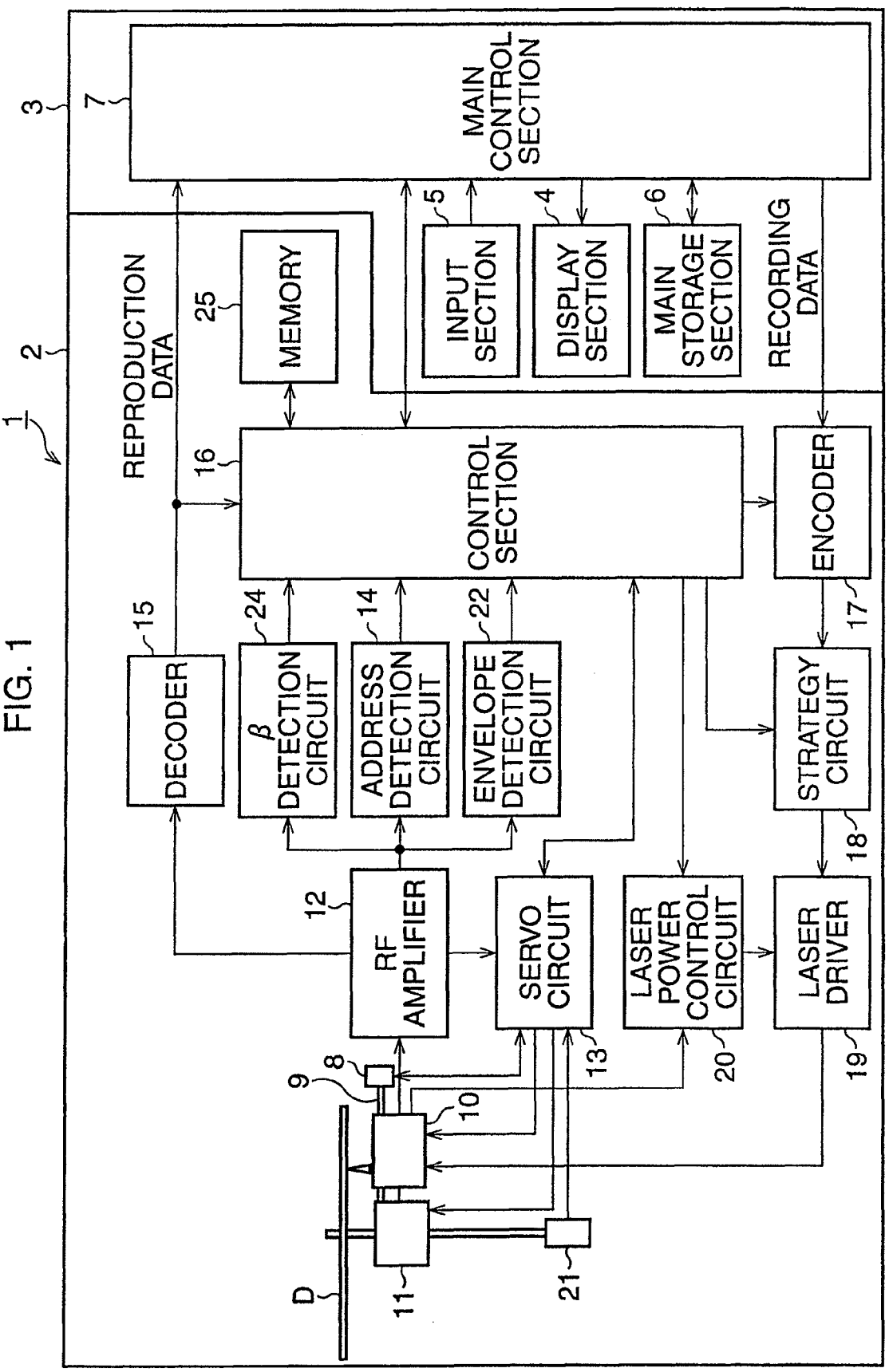
FIG. 1 is a block diagram showing a configuration of the optical disk recording apparatus according to an embodiment of the present invention.

The following describes an optical disk recording apparatus according to an embodiment of the present invention. FIG. 1 is a block diagram showing a configuration of the optical disk recording apparatus according to the embodiment of the present invention. As shown in FIG. 1, an optical disk recording apparatus 1 according to the embodiment of the present invention is configured to comprise an optical disk drive 2 connected to a host computer 3. The optical disk drive 2 comprises a feed motor 8, a guide rail 9, an optical pickup 10, a spindle motor 11, an RF amplifier 12, a servo circuit 13, an address detection circuit 14, a decoder 15, a control section, an encoder 17, a strategy circuit 18, a laser driver 19, a laser power control circuit 20, a frequency generator 21, an envelope detection circuit 22, a □ detection circuit 24, and a storage section 25. The host computer 3 comprises a display section 4, an input section 5, a main storage section 6, and a main control section 7.

The feed motor 8 supplies a driving force for moving the optical pickup 10 in the radial direction of optical disk D.

The guide rail 9 supports the optical pickup 10 so that the optical pickup 10 moves in the radial direction of the optical disk D.

The spindle motor 11 rotatively drives the optical disk D where data should be recorded. There is provided an optical disk chucking mechanism (not shown) comprising a turntable and the like for chucking the optical disk D at the tip of a rotating shaft of the spindle motor 11.

The optical pickup 10 comprises an optical system such as a laser diode, a lens, and a mirror, a return light (reflected light) receiving element, and a focus servo mechanism. During a recording or reproduction operation, a laser beam is irradiated to the optical disk D. The return light from the optical disk D is received to generate a light receiving signal, i.e., an EFM-modulated RF signal which is then output to the RF amplifier 12. The focus servo mechanism is used to maintain a constant distance between the lens of the optical pickup 10 and a data recording surface on the optical disk D. The optical pickup 10 has a monitor diode. The return light from the optical disk D generates a current in the monitor diode. This current is supplied to the laser power control circuit 20.

The frequency generator 21 detects a relative position signal for the optical disk D output from the spindle motor 11 and outputs signals for detecting an angle of rotation and the number of revolutions to the servo circuit 13.

The RF amplifier 12 amplifies the EFM-modulated RF signal supplied from the optical pickup 10 and outputs the amplified RF signal to the servo circuit 13, the address detection circuit 14, the envelope detection circuit 22, the □ detection circuit 24, and the decoder 15.

During reproduction, the decoder 15 EFM-demodulates the EFM-modulated RF signal supplied from the RF amplifier 12 to generate reproduction data and outputs this data to a data storage circuit 25. When recording data, the decoder 15 EFM-demodulates the RF signal supplied from the RF amplifier 12 for reproduction of areas recorded by test recording.

The address detection circuit 14 extracts wobble signal components from the EFM signal supplied from the RF amplifier 12. The wobble signal components include time information (address information) about each position, identification information (disk ID) for identifying the optical disk D, and information indicating disk types such as pigments of the optical disk D. The address detection circuit 14 decodes these pieces of information and outputs a result to the control section 16. The time information (address information) about each position, the identification information (disk ID) for identifying the optical disk D, and the information indicating disk types such as pigments of the optical disk D included in the wobble signal components are also referred to as ATIP (Absolute time in pregroove) information.

When a test recording area is reproduced from the optical disk D, the □ detection circuit 24 calculates □ (asymmetry) as a parameter concerning the reproduction signal quality from the RF signal supplied from the RF amplifier 12 and outputs a calculation result to the control section 16. Here, □ can be found as □=(a+b)/(a−b), where a is a peak level (with the plus sign) of the EFM-modulated signal waveform and b is a bottom level (with the minus sign) thereof.

Before the test recording is performed on the optical disk D, the envelope detection circuit 22 detects an envelope of the EFM signal in a count area 112b on the above-mentioned optical disk D in order to detect from which part of the test area on the optical disk D the test recording should start.

The servo circuit 13 is responsible for rotation control of the spindle motor 11, focus control and tracking control of the optical pickup 10, and feed control of the optical pickup 10 by means of the feed motor 8. Here, the optical disk recording apparatus 1 according to the embodiment can select the CAV (Constant Angular Velocity) system or the CLV (Constant Linear Velocity) system. The CAV system drives the optical disk D at a constant angular velocity during recording. The CLV system drives the optical disk D at a constant linear velocity. Accordingly, the servo circuit 13 selects the CAV system or the CLV system in accordance with a control signal supplied from the control section 16. When the CAV control is selected, the servo circuit 13 controls the spindle motor 11 so that the revolution speed of the spindle motor 11 detected by the frequency generator 21 matches a specified revolution speed. When the CLV control is selected, the servo circuit 13 controls the spindle motor 11 so that the wobble signal component in a signal supplied from the RF amplifier 12 becomes equivalent to a specified linear velocity ratio.

The encoder 17 EFM-modulates recorded data output from the main control section 7 and outputs the data to the strategy circuit 18. The strategy circuit 18 applies time axis correction and the like to the EFM signal from the encoder 17 and outputs the signal to the laser driver 19. The laser driver 19 drives the laser diode of the optical pickup 10 based on a signal modulated in accordance with recorded data supplied from the strategy circuit 18 and a control signal from the laser power control circuit 20.

The laser power control circuit 20 controls power of a laser beam irradiated from the laser diode of the optical pickup 10. More specifically, the laser power control circuit 20 controls the laser driver 19 so that the optical pickup 10 can irradiate a laser beam with an optimum laser power based on an electric current value output from the monitor diode of the optical pickup 10 and information indicative of a target value for the optimum laser power transmitted from the control section 16.

The control section comprises a CPU, ROM, RAM, and the like, and controls each part of the optical disk recording apparatus 1 according to a program stored in the ROM. Prior to final recording of data as mentioned above, the control section 16 controls each part of the apparatus so that test recording is performed for a PCA (to be described) on the optical disk D mounted on the optical disk recording apparatus 1. From a signal obtained by reproducing the PCA, the control section 16 finds a recording speed capable of performing satisfactory recording free of recording errors on the optical disk D for which the optical disk recording apparatus 1 performed test recording based on the signal quality such as a □ value detected by the □ detection circuit 24.

The storage section 25 stores data predetermined by conducting experiments, firmware for the optical disk recording apparatus 1, and the like.

The display section 4 of the host computer 3 displays the signal quality of data recorded on the optical disk D, information transmitted to a user from the optical disk recording apparatus 1, and the like. A user uses the input section 5 to manipulate various controls and operations for the optical disk recording apparatus 1. The main storage section 6 stores visual image formation information and the like. The visual image formation information is used for forming a visual image formed by the optical disk drive 2 on the optical disk D and a data processing program related to the visual image on a data recording surface of the optical disk. The main control section 7 controls each part of the optical disk recording apparatus.

With reference to FIG. 2, an area configuration of the optical disk D will now be described. FIG. 2 is a sectional view showing the area configuration of the optical disk D. The optical disk D has an outside diameter of 120 mm. A region between 40 and 50 mm in diameter on the optical disk D is provided as a lead-in area 114. Outside the lead-in area 114, there are provided a program area 118 for recording data and a lead-out area 120. Inside the lead-in area 114, there are provided a PCA (Power Calibration Area) 112 as an area for calibrating the power and a PMA (Program Memory Area) 113 as an area for storing programs. The PCA 112 to the inside periphery contains a test area 112a and a count area 112b. As mentioned above, test recording is performed on the test area 112a prior to final recording.

The test area 112a is provided as an area capable of performing a plurality of test recording operations. The count area 112b records an EFM signal indicating to which part of the test area 112a the recording has progressed at the end of the test recording. When the test recording is performed next time on the optical disk D, reading the EFM signal from the count area 112b makes it clear that from which position of the test area 112a the test recording should start.

The PMA 113 temporarily stores track information (temporary TOC information) for data being recorded. When a session is closed finally, these pieces of information are recorded in the TOC of the lead-in area.

The optical disk recording apparatus 1 according to the present invention revolves an optical disk to form a visual image on the basis of the CAV system. The optical disk recording apparatus 1 can form a visual image having a high level of visibility by using an azo, low-speed recordable optical disk.

The following description uses CD-R as a recordable optical disk. In order for the optical disk recording apparatus 1 to perform operations to be described below, the main control section 7 reads programs stored in the main storage section 6. Further, the control section 16 reads programs stored in the storage section 25.

First Embodiment

Figure 3A:
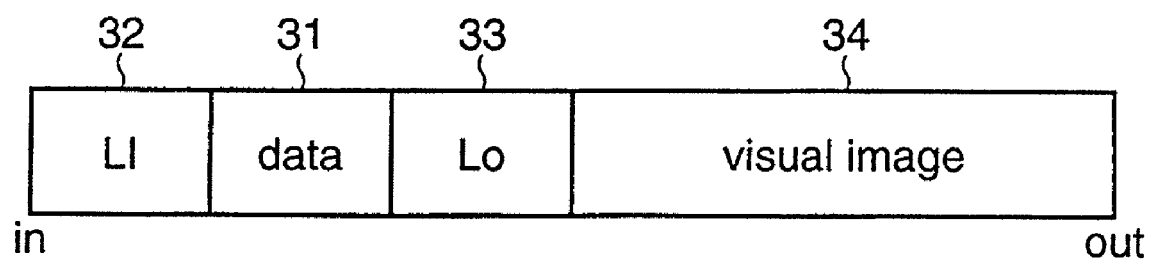
FIGS. 3(A) and 3(B) show configurations of data recorded on an optical disk.
Figure 3B:
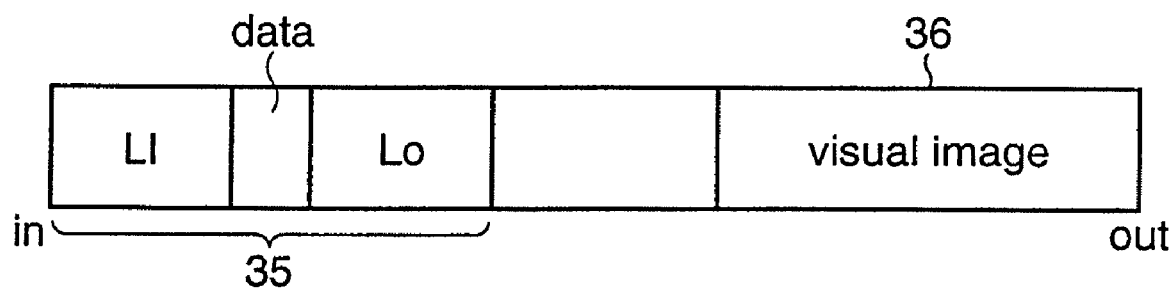

First described is an operation of forming a visual image on the recordable optical disk in the optical disk recording apparatus 1. FIG. 3 shows a configuration of data recorded on the optical disk. When forming a visual image, the optical disk recording apparatus 1 first closes the optical disk, namely, disables writing as a recording end state to prevent additional user data from being written to the optical disk. Then, the optical disk recording apparatus 1 forms a visual image 34 (indicated as "visual image" in FIG. 3) in an unused area of the optical disk. More specifically, when the optical disk records data 31 and is not closed as shown in FIG. 3 (A), the optical disk recording apparatus 1 records lead-in 32 and lead-out 33 for the recorded data, closes a session, and enables a recording end state to disable writing. Based on the visual image formation information stored in the main storage section 6, the optical disk recording apparatus 1 forms the visual image 34 in the unused area outside the lead-out 33. When the optical disk is blank as shown in FIG. 3 (B), the optical disk recording apparatus 1 records a dummy session 35 and then enables the recording end state to disable writing. Based on the visual image formation information temporarily stored in the main storage section 6, the optical disk recording apparatus 1 forms the visual image 36 in the unused area outside the dummy session 35. In this case, the data 31 recorded on the optical disk may be user data or the visual image formation information (to be described in more detail), i.e., information for forming visual images on the data recording surface of the optical disk. The dummy session 35 may record dummy data or the visual image formation information. The visual image can be formed at any position.

In this manner, the optical disk recording apparatus 1 according to the present invention closes the optical disk and then forms a visual image. After the visual image is formed, different music data or computer data cannot be recorded. Accordingly, this makes it possible to prevent different data from being inadvertently overwritten to the visual image. When the visual image is formed on a blank optical disk as mentioned above, the optical disk recording apparatus according to the present invention can record a dummy session, close the disk, and then form the visual image.

Figure 4:
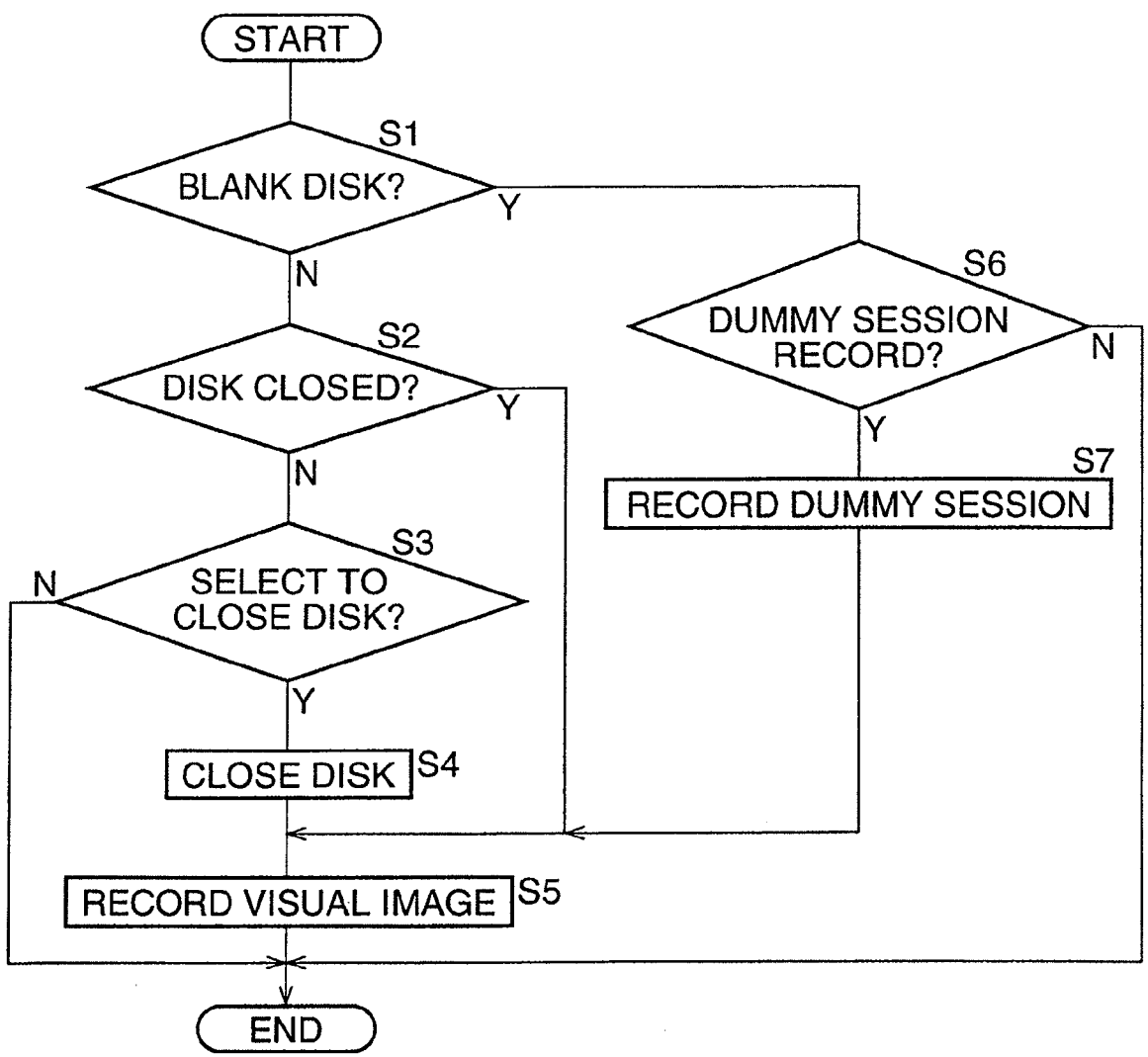
FIG. 4 is a flowchart for explaining operations of the optical disk recording apparatus for forming a visual image.

More specifically, the optical disk recording apparatus 1 forms the visual image according to the following procedure. FIG. 4 is a flowchart for explaining how the optical disk recording apparatus forms the visual image. Here, it is assumed that a recordable optical disk is mounted on the optical disk recording apparatus 1. The description about a process to determine optical disk types is omitted.

The main control section 7 of the optical disk recording apparatus 1 allows the control section 16 to determine whether or not the mounted optical disk is blank (s1). The control section 16 determines whether or not the optical disk is blank by controlling each part of the optical disk drive 2. When the mounted optical disk is blank, the control section 16 outputs a signal notifying this to the main control section 7. Based on this signal, the main control section 7 uses the display section 4 to provide an indication prompting a user to select whether or not to record a dummy session (s6). When the input section 5 supplies an instruction not to record a dummy session, the main control section 7 terminates the visual image forming process. When the input section 5 supplies an instruction to record a dummy session at s6, the main control section 7 outputs a signal for notifying this to the control section 16. When receiving this signal, the control section 16 controls each part of the optical disk drive 2, records the dummy session on the optical disk, and enables the disk-close state (s7). Via the main control section 7, the control section 16 obtains the visual image formation information stored in the main storage section 6. Based on this information, the control section 16 forms the visual image in the unused area of the optical disk and terminates the visual image forming process.

When the mounted optical disk is not blank at s1, the main control section 7 determines whether or not the optical disk is closed (s2). When the optical disk is closed, the main control section 7 performs the process at s5 and terminates the visual image forming process. When the optical disk is not closed at s2, the main control section 7 uses the display section 4 to provide an indication prompting to select whether or not to close the optical disk (s3). When the main control section 7 receives an instruction not to close the optical disk from the input section 5, the control section 16 terminates the visual image forming process. When the main control section 7 receives an instruction to close the optical disk from the input section 5, the main control section 7 outputs a signal instructing the control section 16 to enable the disk-close state. When receiving this signal, the control section 16 performs the process at s4 and later.

Second Embodiment

The following describes an operation when the optical disk recording apparatus 1 is configured to record or form the visual image formation information that is used for forming a visual image on the data recording surface of the optical disk.

Here, the optical disk recording apparatus 1 forms the visual image by rotating the optical disk and irradiating a laser beam. A laser beam irradiation pattern for the visual image formed on the optical disk is created on the basis of an image in the polar coordinate system. On the other hand, the host computer 3 generally processes images belonging to the orthogonal coordinate system. Accordingly, the optical disk recording apparatus 1 converts image data in the orthogonal coordinate system into image data in the polar coordinate system. Then, the optical disk recording apparatus 1 creates the visual image formation information based on the image data in the polar coordinate system and records the visual image on the optical disk based on the visual image formation information.

When forming the visual image, the optical disk recording apparatus 1 according to the present invention can be configured to record the visual image along with the visual image formation information, i.e., the information for forming the visual image on the data recording surface of the optical disk. More specifically, the optical disk recording apparatus 1 according to the present invention can record the following information as the visual image formation information on an optical disk: image data of the visual image, information about a position to start forming the visual image, information about a position to stop forming the visual image, an address able to start recording the next visual image formation information, and the other information.

Figure 5A:
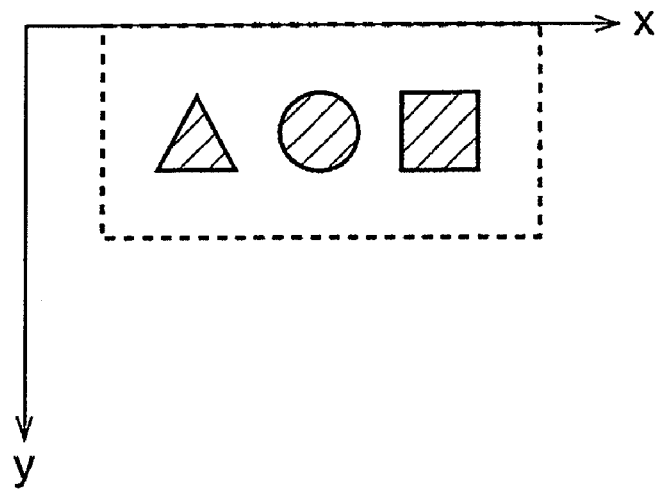
FIGS. 5(A) and 5(B) show an image in the orthogonal coordinate system and an image in the polar coordinate system for a visual image.

FIG. 5 shows an original image for the visual image represented in the orthogonal coordinate system and in the polar coordinate system. As shown in FIG. 5(A), the optical disk recording apparatus 1 records the image data in the orthogonal coordinate system as the original image for the visual image on the optical disk in the bmp format, i.e., an example of file formats suitable for display on a screen. The optical disk recording apparatus 1 uses this image data in the orthogonal coordinate system so that a user can display an image on the display section 4 for selecting or processing that image to be formed as the visual image. Since image data for the orthogonal coordinate system is recorded in the bmp format, the optical disk recording apparatus 1 can quickly display the visual image on the display section 4. A specified data compression technology is used to compress bmp format image data in the orthogonal coordinate system for recording.

Figure 5B:
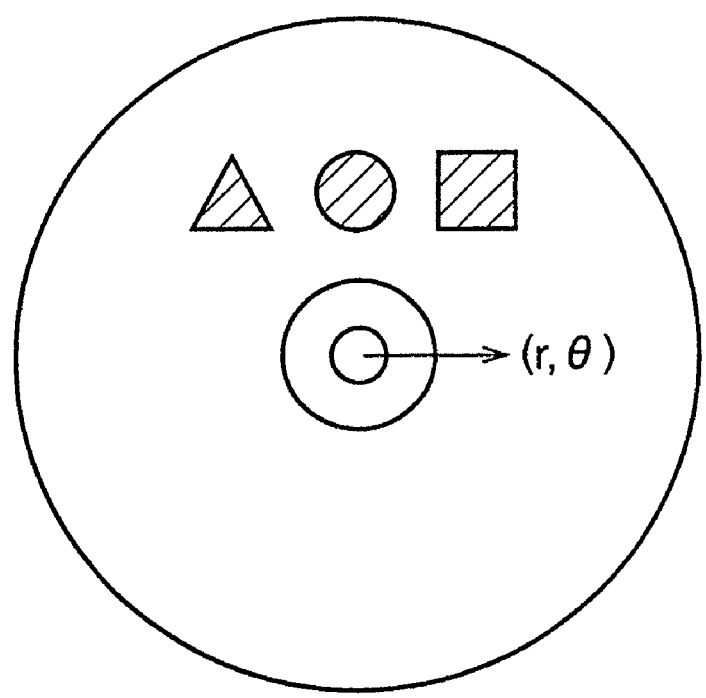

Further, the optical disk recording apparatus 1 records laser beam irradiation pattern information on the optical disk. This information is used as data for recording visual images on the optical disk. The laser beam irradiation pattern is obtained by converting the image data in the orthogonal coordinate system as shown in FIG. 5(A) into the image data in the polar coordinate system as shown in FIG. 5(B), and then converting the image data in the polar coordinate system into the laser beam irradiation pattern information. By recording the laser beam irradiation pattern information, the optical disk recording apparatus 1 can quickly form a visual image based on this information when duplicating the visual image onto another optical disk. A specified data compression technology is used to compress the laser beam irradiation pattern information for recording.

Only either the above-mentioned bmp format image data or the laser beam irradiation pattern information may be recorded as the visual image formation information. However, recording both can save time for converting data in the optical disk recording apparatus 1 when duplicating the visual image onto another optical disk or editing the visual image.

As the other information, the optical disk recording apparatus 1 records a creator name for the image data, a name and a version of application software used to create the image data and the visual image formation information, a creation date of the image data, and the like. Consequently, it is possible to make clear the information about a visual image's copyright holder, and the like. For example, a visual image forming program can be configured not to duplicate a visual image that does not contain these pieces of data.

In addition, the optical disk recording apparatus 1 can record the above-mentioned bmp format image data and the laser beam irradiation pattern information as main channel data and the other data as sub-codes on the optical disk.

Since the visual image formation information is recorded together with the visual image, it is possible to easily duplicate the visual image formed on a given optical disk onto another optical disk. As mentioned above, the visual image formed on the optical disk is not recorded with an EFM-modulated RF signal. It is difficult duplicate such visual image as is onto another optical disk. However, the optical disk recording apparatus 1 according to the present invention simultaneously records the visual image formation information when forming a visual image on the optical disk. When forming the visual image on another optical disk, the optical disk recording apparatus 1 can read the visual image formation information recorded on the original optical disk and form the visual image on another optical disk based on the visual image formation information.

Since it is possible to identify a range of visual image formation (from the formation start position to the formation end position), a plurality of visual images can be formed without overlapping with each other.

It is possible to confirm a range of visual image formation when data is recorded after visual image formation on an optical disk that is not in the recording end state. Accordingly, additional data can be recorded so as not to overlap the already formed visual image.

Figure 6A:
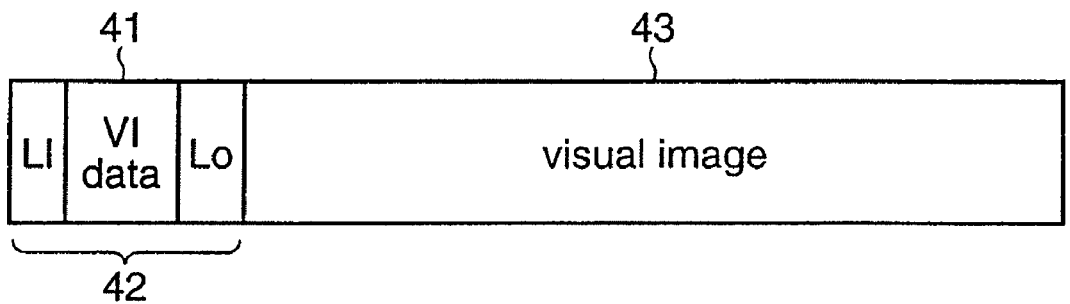
FIGS. 6(A), 6(B) and 6(C) show configurations of data recorded on an optical disk.
Figure 6B:
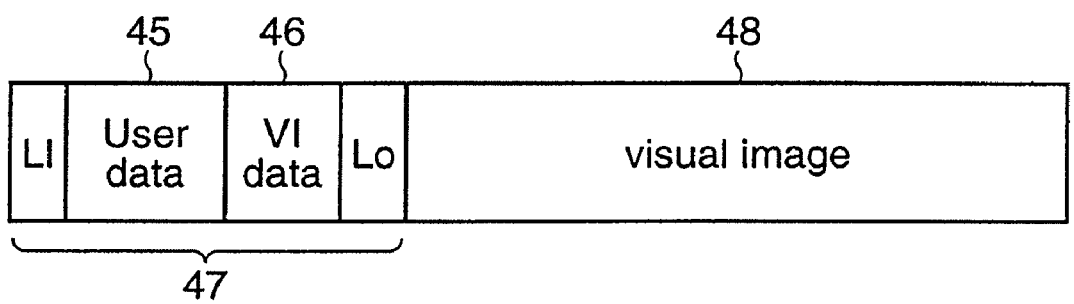
Figure 6C:
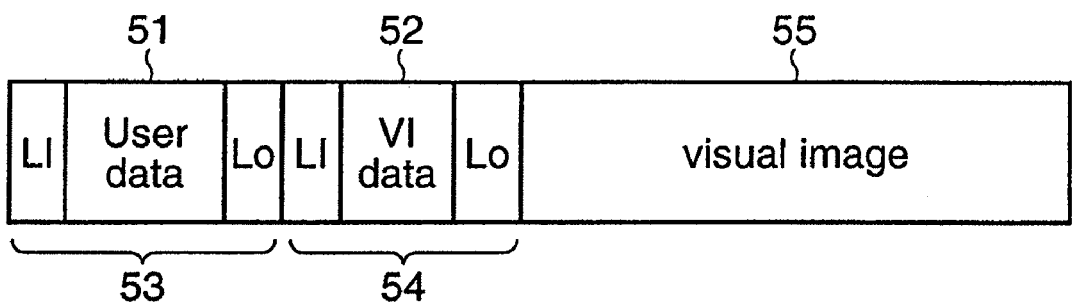

When the visual image formation information and a visual image are recorded and formed on an optical disk, data is configured as shown in FIG. 6. FIG. 6 shows the configuration of data recorded on the optical disk. When the optical disk is blank (unused) as shown in FIG. 6(A), the optical disk is provided with a session 42 recording only visual image formation information 41 (indicated as "VI data" in FIG. 6(A)) and is placed to the disk-close state. A visual image 43 is formed in the unused area of the optical disk. As shown in FIG. 6(B), the optical disk can be also provided with a session 47 recording user data 45 and visual image formation information 46 and be placed to the disk-close state. A visual image 48 can be formed in the unused area of the optical disk. When user data 51 is recorded on the optical disk as shown in FIG. 6(C), a session 51 can be closed. The optical disk can be also provided with a session 54 recording only visual image formation information 52 and be placed to the disk-close state. A visual image 55 can be formed in the unused area of the optical disk.

Figure 7:
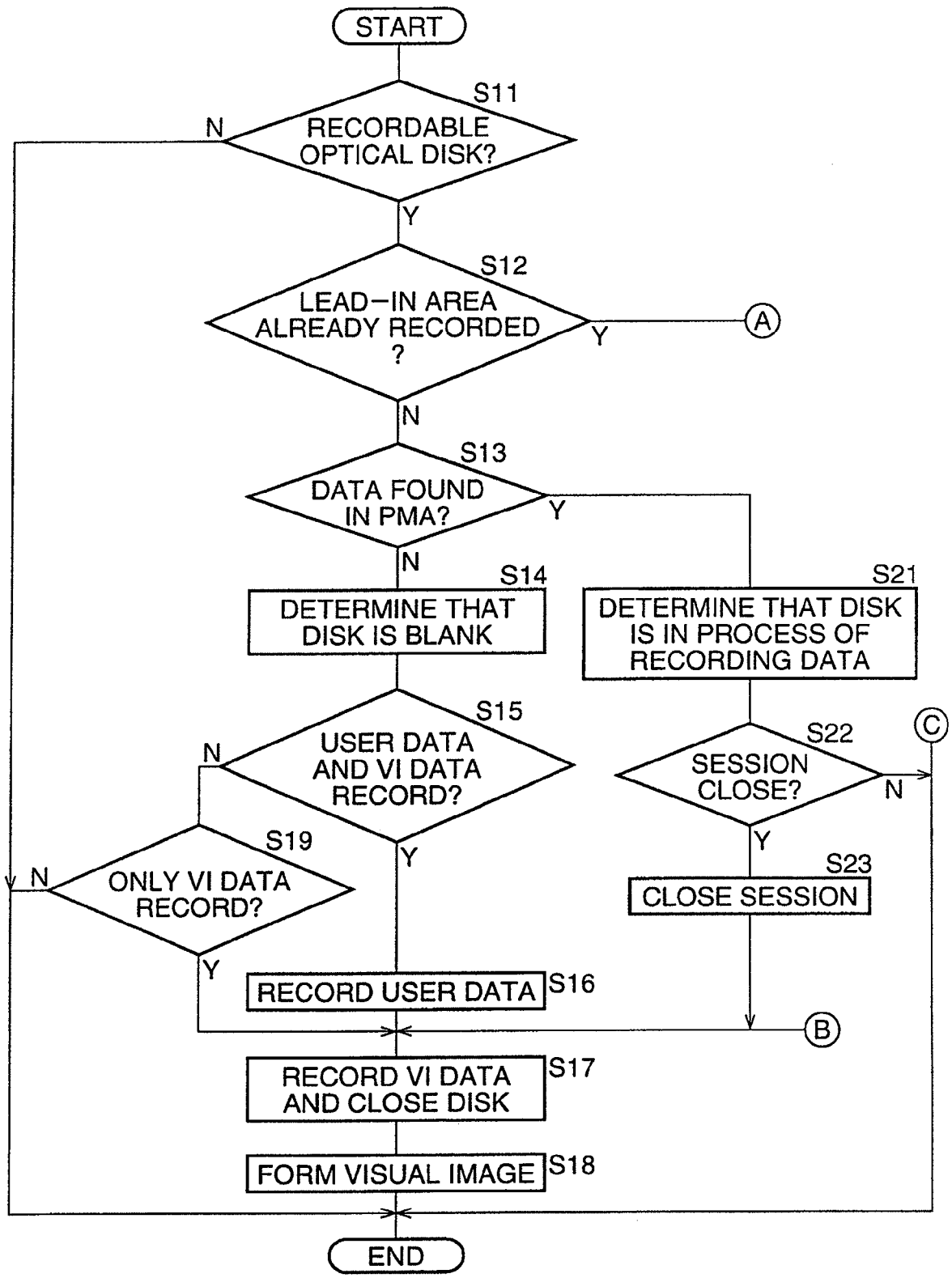
FIG. 7 is a flowchart for explaining operations of the optical disk recording apparatus for forming visual image formation information and a visual image.
Figure 8:
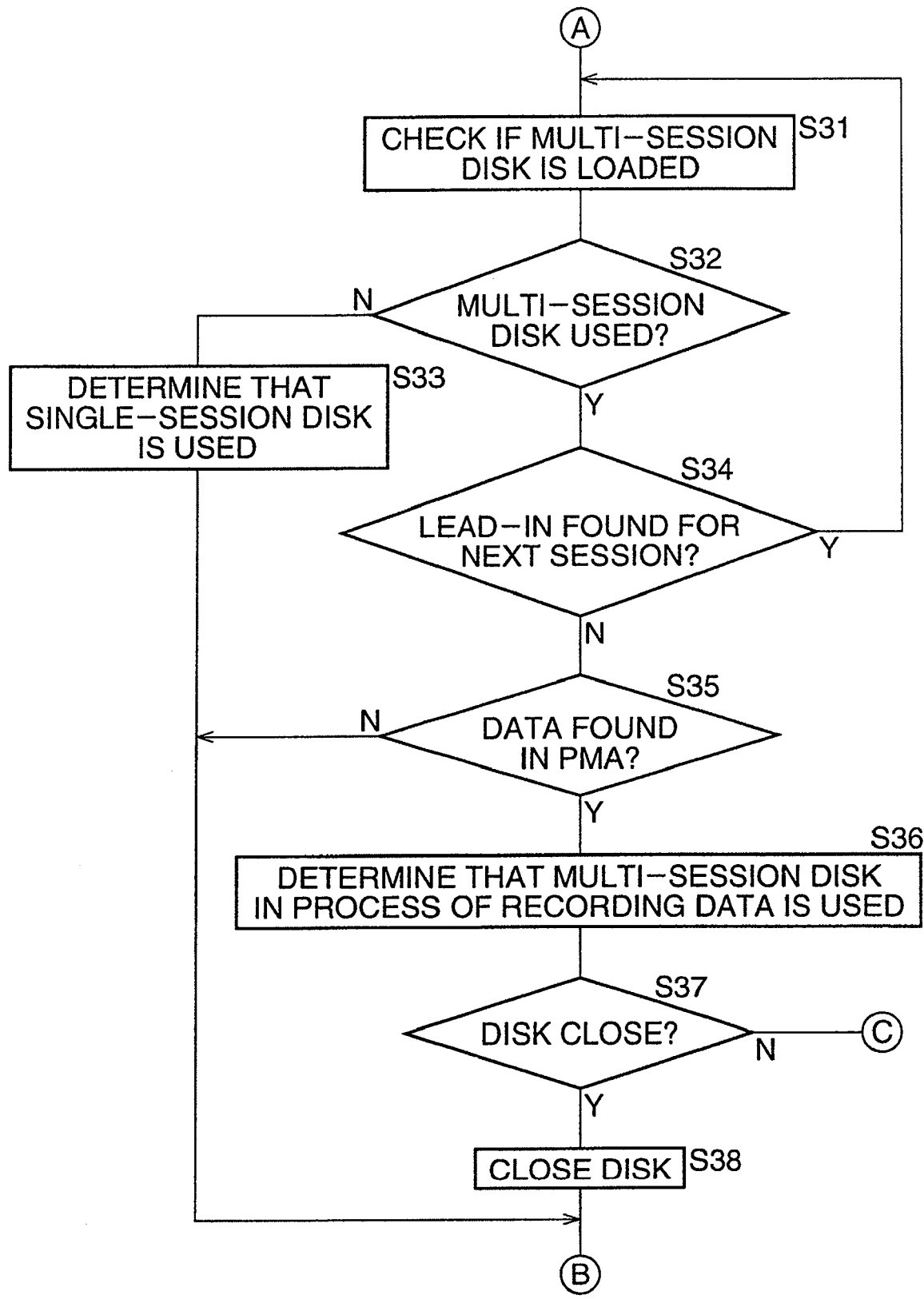
FIG. 8 is a flowchart for explaining operations of the optical disk recording apparatus for forming visual image formation information and a visual image.

The following describes a specific procedure for the optical disk recording apparatus 1 to form the visual image formation information and a visual image on the optical disk. FIGS. 7 and 8 are flowcharts explaining operations of the optical disk recording apparatus 1 for forming the visual image formation information and a visual image. In the optical disk recording apparatus 1, it is assumed that the main control section 7 reads a visual image recording program already stored in the main storage section 6.

When forming a visual image on the optical disk, the main control section 7 of the optical disk recording apparatus 1 first checks whether or not the mounted optical disk can record data. More specifically, the main control section 7 allows the control section 16 to confirm whether or not a wobble signal is found on the optical disk and to determine whether the optical disk is a read-only optical disk or a recordable optical disk. When the mounted optical disk is a read-only optical disk, the main control section 7 terminates the visual image forming process. When the mounted optical disk is a recordable optical disk, the main control section 7 allows the control section 16 to confirm a recording state of the lead-in area (s12). When nothing is recorded in the lead-in area, the main control section 7 allows the control section 16 to confirm whether or not data is recorded in the PMA (s13). When no data is recorded in the PMA, the main control section 7 determines that the optical disk is blank (s14). The main control section 7 uses the display section 4 to provide an indication prompting a user to determine whether or not to record user data and the visual image formation information as a dummy session (s15). When the input section 5 supplies an instruction to record the user data and the visual image formation information, the main control section 7 allows the control section 16 to record the user data stored in the main storage section 6, e.g., as a first track on the optical disk (s16). Then, the main control section 7 allows the control section 16 to record the visual image formation information stored in the main storage section 6, e.g., as a second track on the optical disk and to close the disk (s17). The main control section 7 allows the control section 16 to form a visual image in the unused area of the optical disk (s18) based on the visual image formation information. The main control section 7 then terminates the visual image forming process. In this case, the optical disk has the data configuration as shown in FIG. 6(B).

When the input section 5 supplies an instruction not to record the user data and the visual image formation information at s15, the main control section 7 allows the display section 4 to provide an indication prompting a user to determine whether or not to record only the visual image formation information as a dummy session (s19). When the input section 5 supplies an instruction to record only the visual image formation information, the main control section 7 allows the control section 16 to record the visual image formation information stored in the main storage section 6 on the optical disk and enables the disk-close state (s17). The main control section 7 allows the control section 16 to form a visual image in the unused area of the optical disk (s18) based on the visual image formation information. The main control section 7 then terminates the visual image forming process. In this case, the optical disk has the data configuration as shown in FIG. 6(A). When the input section 5 supplies an instruction not to record the dummy session, the main control section 7 terminates the visual image forming process.

When data is recorded in the PMA at s13, the main control section 7 determines that the disk is in process of recording data (s21). The main control section 7 allows the display section 4 to provide an indication prompting a user to determine whether or not to close the session (s22). When the input section 5 supplies an instruction not to close the session, the main control section 7 terminates the visual image forming process. When the input section 5 supplies an instruction to close the session, the main control section 7 allows the control section 16 to close the session on the optical disk (s23). The main control section 7 allows the control section 16 to record the session for the visual image formation information stored in the main storage section 6 on the optical disk and enables the disk-close state (s17). The main control section 7 allows the control section 16 to form a visual image in the unused area of the optical disk (s18) based on the visual image formation information stored in the main storage section 6. The main control section 7 then terminates the visual image forming process. In this case, the optical disk has the data configuration as shown in FIG. 6(C).

When the mounted optical disk is found to be provided with the lead-in area at s12, the main control section 7 allows the control section 16 to confirm whether or not the optical disk is a multi-session disk at s31 in FIG. 8. Here, the lead-in area records TOC information as the sub-code information. A multi-session disk is identified with the sub-code information whose entries contain ADR=5, TNO=0, and POINT=$B0. The main control section 7 determines whether or not the optical disk is a multi-session disk (s32). When the optical disk is not a multi-session disk, the main control section 7 determines that the optical disk is a single-session disk placed in the recording end state and incapable of further writing (s33). The main control section 7 allows the control section 16 to perform the process at s17 and later. In this case, the optical disk has the data configuration as shown in FIG. 6(C).

When the optical disk is determined to be a multi-session disk at s32, the main control section 7 allows the control section 16 to determine whether or not the next session contains the lead-in (s34). When the optical disk records the lead-in, the main control section 7 allows the control section 16 to reexecute the process at s31 to determine whether or not a plurality of sessions is available. When it is determined at s34 that no lead-in is recorded, the main control section 7 allows the control section 16 to determine whether or not the PMA contains data (s35). When the optical disk does not record the related PMA data, the main control section 7 performs the process at s17 and later in FIG. 7. In this case, the optical disk has the data configuration as shown in FIG. 6(C).

When the optical disk records the PMA data, the main control section 7 determines that the disk is a multi-session disk in process of recording data (s36). The main control section 7 allows the display section 4 to provide an indication prompting a user to determine whether or not to close the disk (s37). When the input section 5 supplies an instruction not to close the disk, the main control section 7 terminates the visual image forming process. When the input section 5 supplies an instruction to enable the disk-close state, the control section 16 enables the disk-close state and performs the process at s18. In this case, the optical disk has the data configuration as shown in FIG. 6(C).

Figure 9:
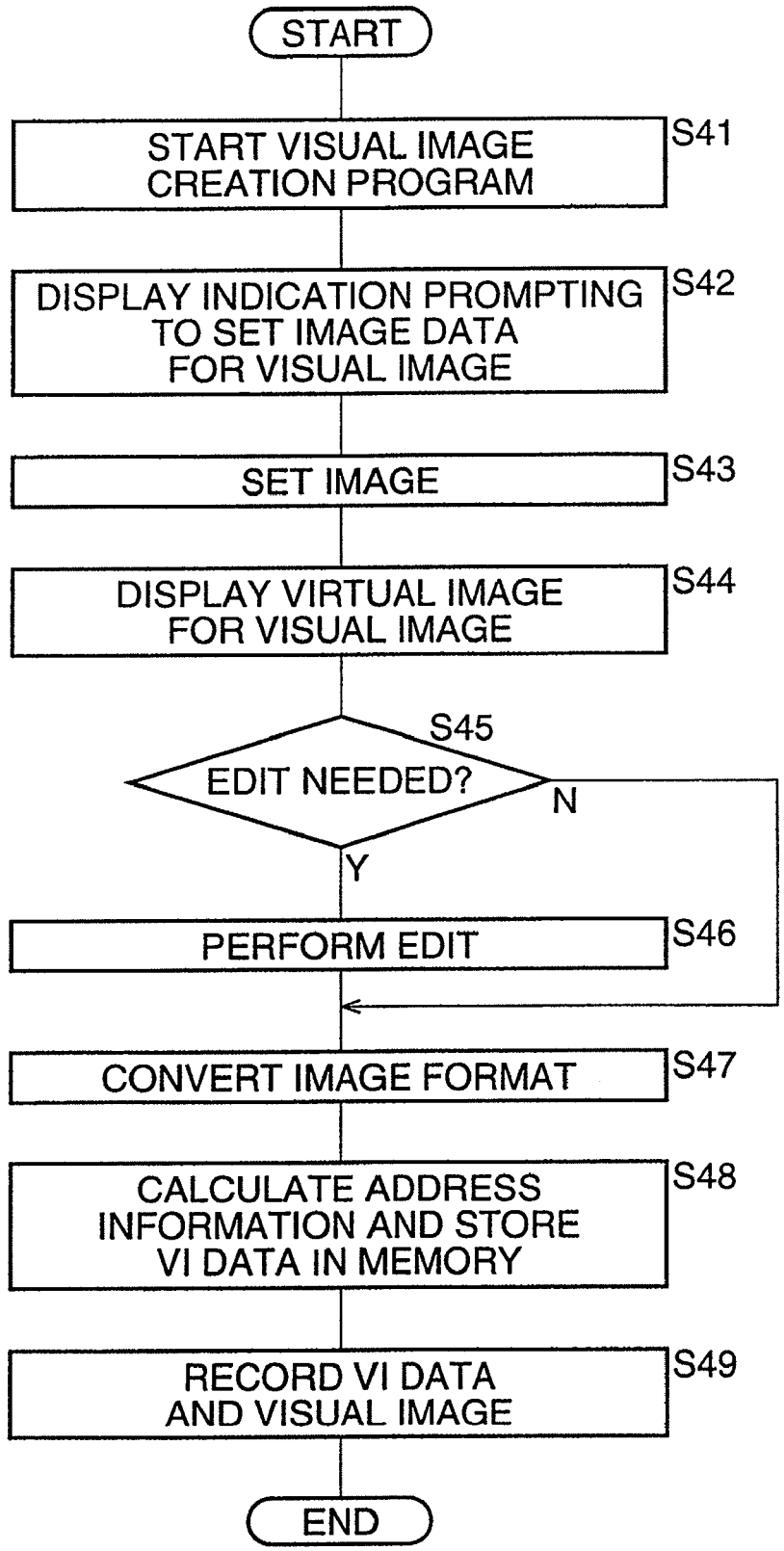
FIG. 9 is a flowchart for explaining a specific procedure of the optical disk recording apparatus for determining a visual image formed on an optical disk.
Figure 10A:
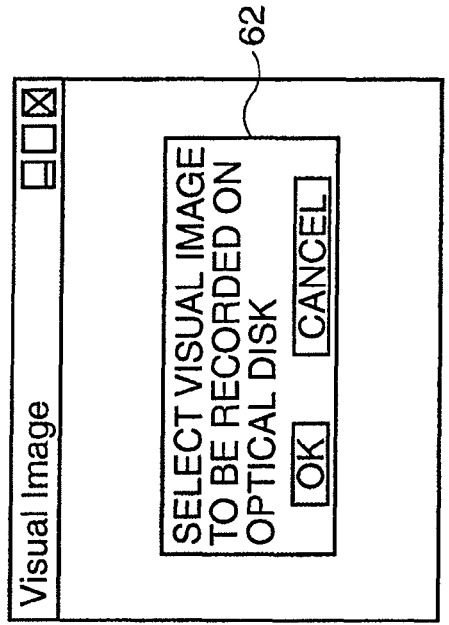
FIGS. 10(A), 10(B), 10(C) and 10(D) are a display example of a visual image creation program.
Figure 10B:
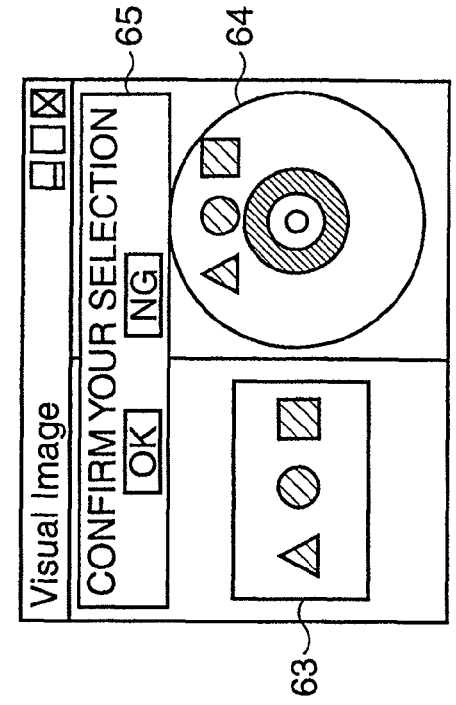
Figure 10C:
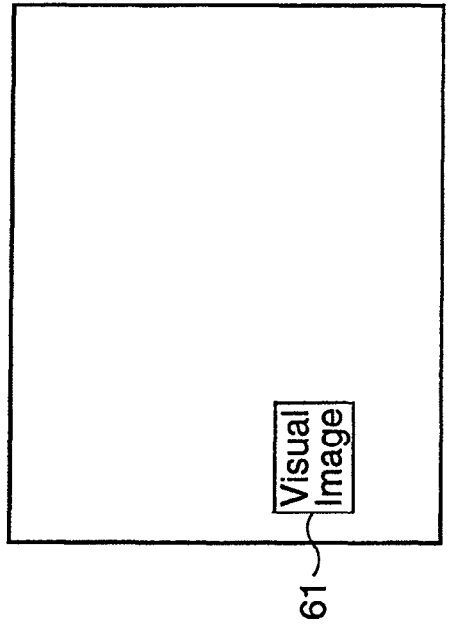

The following describes a specific procedure for determining a visual image to be formed on the optical disk in the optical disk recording apparatus 1. FIG. 9 is a flowchart explaining a specific procedure for determining a visual image to be formed on the optical disk in the optical disk recording apparatus 1. FIG. 10 shows display examples of a visual image creation program. As shown in FIG. 10(A), the display section 4 of the optical disk recording apparatus 1 displays an icon 61 of the visual image creation program. A user selects the icon 61 to initiate the visual image creation program. When detecting this operation, the main control section 7 of the optical disk recording apparatus 1 reads and starts the visual image creation program stored in the main storage section 6 (s41). As shown in FIG. 10(B), the main control section 7 allows the display section 4 to display an indication 62 prompting the user to select any character or picture (image data in the orthogonal coordinate system) to be formed as the visual image on the optical disk (s42). As shown in FIG. 10(C), the user follows this indication to select an image 63 such as any character or picture to be recorded as the visual image on the optical disk. At this time, the user may enter any character from the input section 5 or create any image using image creation software. Further, it may be preferable to read character data or image data stored in the storage section 6 of the host computer 3. Yet further, it may be preferable to obtain character data or image data from an Internet home page.

Figure 10D:
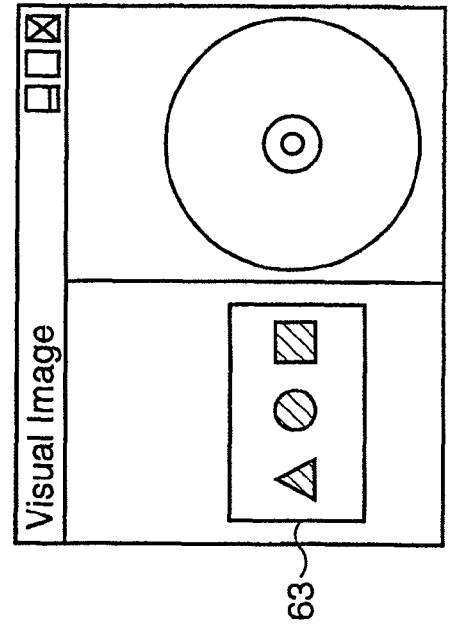

When the image 63 in the orthogonal coordinate system is selected (s43) as shown in FIG. 10(D), the optical disk recording apparatus 1 uses the display section 4 to display an image 64, i.e., a virtual image of the visual image comprising the selected image data superposed on the optical disk based on the already obtained information about the unused area of the recordable optical disk (s44). The main control section 7 uses the display section 4 to display an indication 65 prompting the user to determine whether or not to edit the visual image (s45). To determine the display image on the display section 4 after the visual image formation, the user selects a decision button displayed on the display section 4 to instruct the optical disk recording apparatus 1 to form the visual image. When any problem is found in the display image on the display section 4 after the visual image formation, the user processes the displayed image by changing the visual image formation position or adjusting the visual image size (s46). When the adjustment is complete, the user selects the decision button to instruct the optical disk recording apparatus 1 to form the visual image.

When the user issues the instruction to form a visual image, the main control section 7 of the optical disk recording apparatus 1 converts the user-specified image data in the orthogonal coordinate system into image data in the polar coordinate system (s47). The main control section 7 then performs a calculation to find a start address and a formation end address based on the image data in the polar coordinate system when the visual image is to be formed on the optical disk. Further, the main control section 7 performs a calculation to find the last address for recording the visual image formation information, i.e., an address able to start recording the next visual image formation information. The main control section 7 stores the visual image formation information in the main storage section 6 (s48). The main control section 7 records the visual image formation information read from the main storage section 6 or the visual image formation information maintained in the main control section 7 on the optical disk. Further, the main control section 7 forms the visual image on the optical disk based on the visual image formation information (s49) and terminates the visual image forming process.

Third Embodiment

The following describes operations of the optical disk recording apparatus according to the present invention for forming or writing a plurality of visual images. As mentioned above, the optical disk recording apparatus 1 according to the present invention records visual images and the visual image formation information on optical disks. With reference to the visual image formation information, it is possible to add (or additionally write) a visual image to the optical disk where the visual image is formed in the optical disk recording apparatus 1.

FIG. 11 shows data configurations when a plurality of visual images is formed. When a plurality of visual images is formed on the optical disk, the optical disk recording apparatus 1 can form visual images using a plurality of data configuration patterns as shown in FIG. 11. As mentioned above, the optical disk recording apparatus 1 according to the present invention can record the following information as the visual image formation information on an optical disk: image data of the visual image, information about a position to start forming the visual image, information about a position to stop forming the visual image, an address able to start recording the next visual image formation information, and the other information.

When forming a plurality of visual images on the optical disk, the main control section 7 records or forms a session (hereafter referred to as VIS) 1 recording only the visual image formation information and a visual image (represented as VI in FIG. 11) 1. When user data is recorded in this case, the main control section 7 closes the disk and records the VIS 1 subsequently to a data session that performed the disk-close operation. Accordingly, the visual image formation information cannot be read by an ordinary optical disk recording and reproducing apparatus and can be used as hidden information. In addition, only a specific optical disk recording apparatus can read the visual image formation information recorded on the optical disk for forming a visual image.

As shown in FIG. 11(A) shows a data configuration pattern for forming a plurality of visual images. This pattern makes it possible to form a visual image immediately after the VIS to record and form plurality of VIS's and visual images. Before the visual image 1 is formed, it is possible to perform a calculation to find visual image formation start and end positions to be recorded in the VIS 1, record the VIS 1, and then form the visual image 1. In this case, the formation end position of the visual image 1 may somewhat vary. It is preferable to specify a next VIS 2 as an address capable of starting the recording, and use an address incremented by a specified address as the calculated formation end position for the visual image 1.

It is also possible to calculate the amount of data for the VIS 1 in advance, provide an unused area for recording the VIS 1 after the first session, form the visual image 1, obtain the formation start and end addresses for the visual image 1, and finally record the VIS 1.

When adding a visual image, the main control section 7 reads the previous VIS (e.g., the VIS 1 when recording the VIS 2), obtains an address able to start recording the next visual image formation information, and records the additional VIS from this address. The same method is used to record a VIS 3 and a visual image 3 and later.

As shown in FIG. 11(B), the optical disk recording apparatus 1 also can consecutively record VIS's after the first session and consecutively form visual images from the outside periphery. In this case, a calculation is performed so that the end of the visual image matches the outmost periphery of a formation area on the optical disk, and then the visual image 1 is formed from the inside periphery. Before the visual image 1 is formed, it is possible to perform a calculation to find visual image formation start and end positions to be recorded in the VIS 1, record the VIS 1, and then form the visual image 1. It is also possible to form the visual image 1, obtain the formation start and end addresses for the visual image 1, and then record the VIS 1.

When adding a visual image, the main control section 7 reads the previous VIS (e.g., the VIS 1 when recording the VIS 2), obtains an address able to start recording the next visual image formation information (VIS 2), and records the VIS 2 from this address location. The main control section 7 performs a calculation so that the end of the visual image 2 matches the beginning of the visual image 1, and then forms the visual image 2 from the inside periphery. Further, the main control section 7 records the VIS 3 and the visual image 3 and later in the same manner.

Moreover, as shown in FIG. 11(C), it is also possible to consecutively record VIS's after the first session and sequentially form visual images from any location toward the outside periphery. In this case, a formation start address for the visual image 1 needs to be positioned with a specified interval from the end of the VIS 1 so that a plurality of VIS's can be recorded.

Before the visual image 1 is formed, it is possible to perform a calculation to find visual image formation start and end positions to be recorded in the VIS 1, record the VIS 1, and then form the visual image 1. It is also possible to form the visual image 1, obtain the formation start and end addresses for the visual image 1, and then record the VIS 1.

When adding a visual image, the main control section 7 reads the previous VIS (e.g., the VIS 1 when recording the VIS 2), obtains an address able to start recording the next visual image formation information (VIS 2), and records the VIS 2 from this address location. It may be preferable to perform a calculation so that the beginning of the visual image 2 matches the end of the visual image 1, and then record the visual image 2. Furthermore, as shown in FIG. 11(C), it is also possible to provide some interval between the beginning of the visual image 2 and the end of the visual image 1. The same method is used to record the VIS 3 and the visual image 3 and later.

Figure 12:
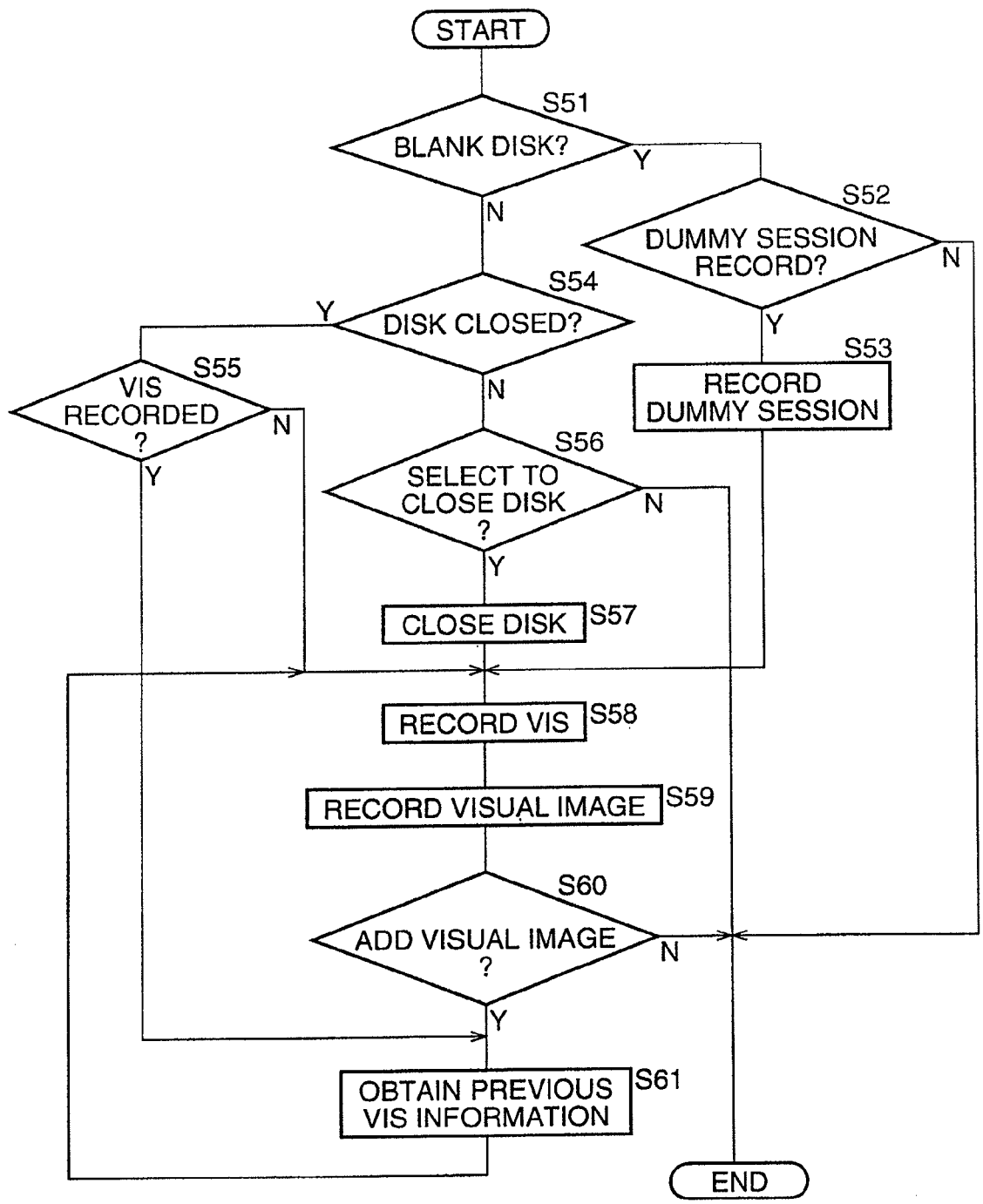
FIG. 12 is a flowchart for explaining operations of the optical disk recording apparatus for forming and adding a visual image.

More specifically, the optical disk recording apparatus 1 forms and adds a visual image as follows. FIG. 12 is a flowchart explaining operations of the optical disk recording apparatus for forming and adding a visual image. Here, it is assumed that the optical disk mounted on the optical disk recording apparatus 1 is a recordable optical disk. The following description assumes that a calculation is performed before visual image formation to find formation start and end positions of a visual image to be recorded for a VIS; the VIS is recorded; and then the visual image is formed. A detailed description of this process is omitted.

The main control section 7 of the optical disk recording apparatus 1 allows the control section 16 to determine whether or not the mounted optical disk is blank (s51). When the mounted optical disk is blank, the main control section 7 inquires a user whether or not to record a dummy session (s52). At this time, the dummy session data is assumed to be user data or dummy data. When the user operates the input section 5 to select not to record the dummy session on the optical disk, the main control section 7 terminates the visual image forming process. When the user operates the input section 5 to select to record the dummy session on the optical disk at s52, the main control section 7 allows the control section 16 to record the dummy session on the optical disk and enable the disk-close state (s53). The control section 16 reads the visual image formation information stored in the main storage section 6 and records the visual image formation information in the unused area (unrecorded area) of the optical disk (s58). Further, the control section 16 forms the visual image in the unused area of the optical disk based on the visual image formation information (s59). The main control section 7 inquires the user whether or not to add a visual image (s60). When the user operates the input section 5 to select not to add a visual image to the optical disk, the main control section 7 terminates the visual image forming process. When the user operates the input section 5 to select to add a visual image to the optical disk at s60, the main control section 7 reads the most recently recorded visual image formation information to obtain the next visual image formation information and the information about a position to form the visual image (s61). Then, the main control section 7 performs the process at s58 and later.

When the mounted optical disk is not blank at s51, the main control section 7 determines whether or not the optical disk is closed (s54). When the optical disk is closed, the main control section 7 determines whether or not the VIS is recorded (s55). When the VIS is recorded on the optical disk, the visual image is to be added. The main control section 7 performs the process at s61 and later. When no VIS is recorded on the optical disk, the main control section 7 performs the process at s58 and later.

When the optical disk is not closed at s54, the main control section inquires the user whether or not to close the optical disk (s56). When the user operates the input section 5 to select not to close the optical disk, the main control section 7 terminates the visual image forming process. When the user operates the input section 5 to select to close the optical disk, the main control section 7 enables the disk-close state of the optical disk (s57), and then performs the process at s58 and later.

The user may start the visual image creation program when determining the visual image to be added to the optical disk. In such case, the optical disk recording apparatus 1 retrieves the visual image formation information from the optical disk and the unused area information and displays a virtual image on the display section 4. When the user specifies a visual image to be formed, the optical disk recording apparatus 1 uses the display section 4 to display this image superposed on the virtual image. Accordingly, the user can set the new visual image and adjust its arrangement by referencing the virtual image.

Fourth Embodiment

The following describes operations of the optical disk recording apparatus for duplicating a visual image. When duplicating an optical disk that records the visual image formation information, the optical disk recording apparatus according to the present invention duplicates the visual image formation information onto another optical disk and forms a visual image on another optical disk based on the visual image formation information. This makes it possible to easily duplicate visual images whose duplication has been impossible conventionally. In addition, it is possible to form a visual image approximately the same as that formed on the original optical disk.

There may be a case where the original optical disk forms no visual image and records only the visual image formation information. In such case, the optical disk recording apparatus 1 according to the present invention duplicates the visual image formation information onto another optical disk and forms a visual image on another optical disk based on the visual image formation information. This makes it possible to easily manage which optical disk is duplicated, for example. When the optical disk having no visual image is duplicated, a duplicated optical disk can be used to produce a new image pattern. This technique can be used for advertisement, for example.

Figure 13:
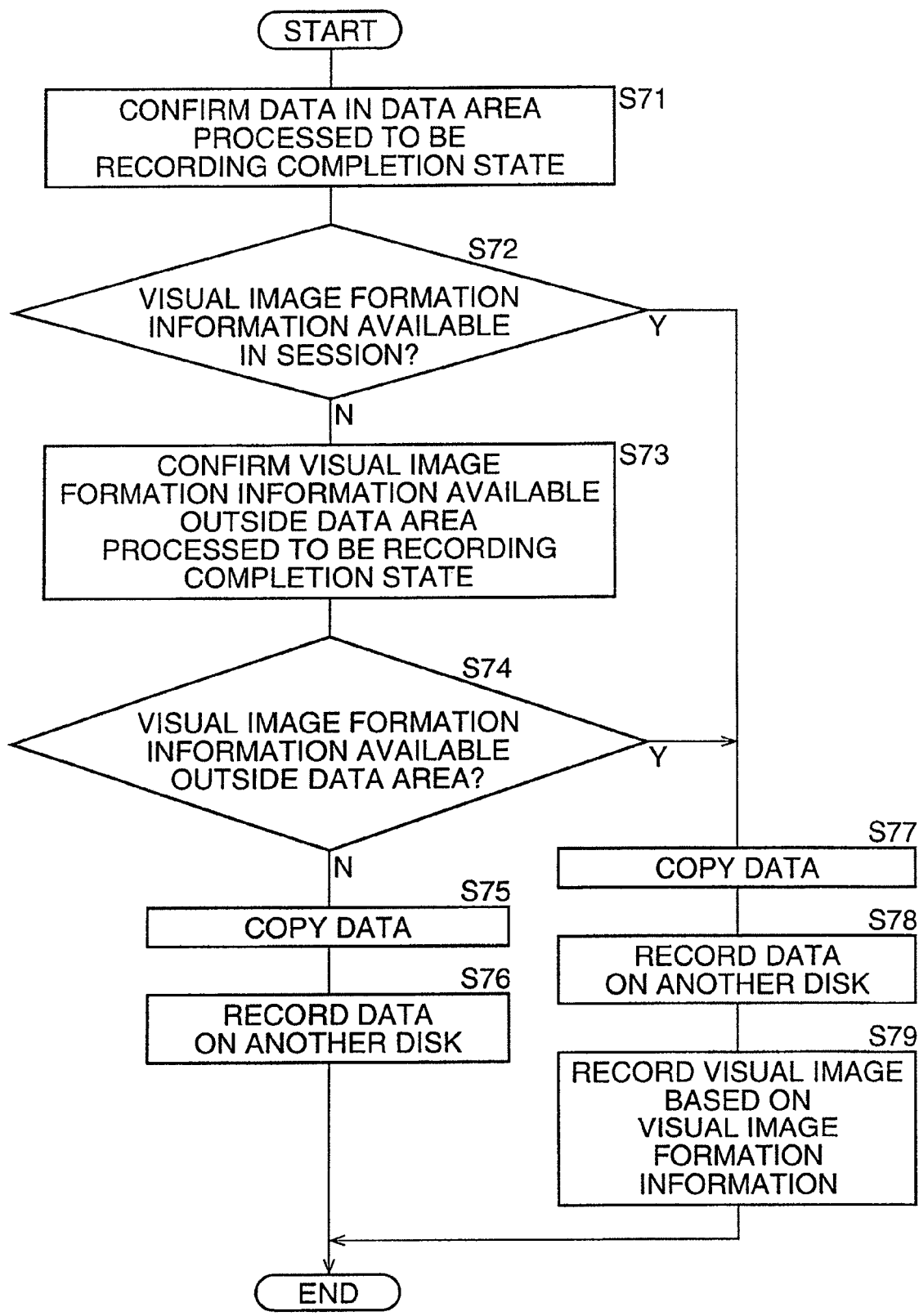
FIG. 13 is a flowchart for explaining operations of the optical disk recording apparatus according to the present invention for duplicating an optical disk.

FIG. 13 is a flowchart explaining operations of the optical disk recording apparatus according to the present invention for duplicating an optical disk. The main control section 7 of the optical disk recording apparatus 1 allows the control section 16 to confirm data recorded for each session on a duplication source optical disk (s71). When the data recorded for each session contains the visual image formation information (s72), the main control section 7 uses the main storage section 6 to temporarily store the data recorded on the optical disk (s77). The main control section 7 records the data stored in the main storage section 6 onto another optical disk (s78). Based on the visual image formation information stored in the main storage section 6, the main control section 7 then forms a visual image on this another optical disk (s79), and terminates the process.

On the other hand, when no visual image formation information is recorded as data for each session at s72, the main control section 7 then confirms whether or not the visual image formation information is recorded outside the data area in the recording end state (s73). When the visual image formation information is recorded outside the data area in the recording end state (s74), the main control section 7 performs the process at s77. When the visual image formation information is not recorded outside the data area in the recording end state at s74, the main control section 7 temporarily stores the original optical disk data in the main storage section 6 (s75). The main control section 7 then records the data stored in the main storage section 6 onto another optical disk (s76), and terminates the process.

The following operations may be used to duplicate data recorded on the optical disk. First, the user data is copied to determine whether or not the visual image formation information is available. When the visual image formation information is recorded, this visual image formation information is copied. Based on this visual image formation information, the visual image is formed on a copy destination optical disk.

The present invention can provide the following advantages.

(1) After the optical disk is placed to the recording end state and made incapable of additional writing, a visual image is formed in the unused area of the optical disk. After the visual image is recorded, further music data or computer data cannot be recorded. This makes it possible to prevent different data from being inadvertently overwritten to the visual image. When the visual image is to be formed on a blank optical disk, it is possible to automatically record a dummy session, close the disk, and then form the visual image.

(2) A visual image is formed and the visual image formation information is recorded on the data recording surface of the optical disk, wherein the visual image formation information is used for forming the visual image on the data recording surface of the optical disk. When the visual image needs to be formed on another optical disk, the visual image formation information recorded on the original optical disk is read. Based on this visual image formation information, the visual image can be formed on another optical disk.

(3) When the visual image is to be formed on the optical disk, the visual image formation information is recorded. The optical disk is then placed to the recording end state and is made incapable of additional writing. Accordingly, the visual image formation information can be read as normal data.

(4) When the visual image is to be formed on the optical disk, the optical disk is placed to the recording end state and is made incapable of additional writing. The visual image formation information is then recorded in the unused area of the optical disk. Accordingly, the visual image formation information cannot be read by an ordinary optical disk recording and reproducing apparatus and can be reserved as hidden information. Only a specific optical disk recording apparatus can read the visual image formation information recorded on the optical disk for reproducing a visual image.

(5) As the visual image formation information, the optical disk records information about a position to start forming the visual image, information about a position to stop forming the visual image, and a laser beam irradiation pattern for visual image formation. This makes clear a range of visual image formation from the formation start position to the formation end position. A plurality of visual images can be formed without overlap. After the visual image is formed on an optical disk that is not in the recording end state, further data may be recorded on this disk. In such case, it is possible to confirm a range of visual image formation. The additional data can be recorded without overlap with the already formed visual image. Further, there is provided the laser beam irradiation pattern for visual image formation. It is possible to fast form the visual image without converting original image data for the visual image.

(6) Image data for the visual image is recorded in a file format appropriate for display on the screen. The optical disk records that image data as the visual image formation information. Accordingly, the visual image information can be fast displayed on an optical disk recording apparatus.

(7) As the visual image formation information, the optical disk records the start position information about the next visual image formation information or the position information able to start recording the next visual image formation information. The visual image formation information can be recorded without overlap. When the optical disk records a plurality of visual image formation information, each visual image formation information can be read sequentially.

(8) The visual image is formed on the basis of the visual image formation information that is created so as not to cause an overlap in the range of visual image formation from the formation start position to the formation end position. A plurality of visual images can be formed without overlap on the optical disk.

(9) After the visual image formation information is duplicated to a duplication destination optical disk, the visual image is formed on the duplication destination optical disk based on the visual image formation information. It is possible to form almost the same visual image on the duplication destination optical disk as the visual image formed on the duplication origin optical disk. Even if only the visual image formation information is recorded on the duplication origin optical disk, a visual image can be formed on a duplication destination optical disk by reading the visual image formation information. This makes it possible to easily check if any optical disk is original or duplicated. The optical disk can be used for advertisement and the like.

What is claimed is:

1. A method of forming a visual image having a specified shape on a surface of an optical disk by using an optical writing process of irradiating a laser beam onto the surface of the optical disk to form pits, the optical disk being capable of recording information on the surface thereof by the optical writing process, the method comprising the steps of:

checking a recording state of an optical disk to determine whether or not the optical disk is capable of additionally recording information;

prompting a user on a display to instruct whether or not the optical disk should be made unable to additionally record information in case that the optical disk is determined to be capable of additionally recording information;

placing the optical disk in a recording end state while an available area is left on the surface of the optical disk when the user instructs that the optical disk should be made unable to additionally record information on the available area any more, and subsequently forming the visual image in the available area of the optical disk by using the optical writing process; and terminating processes of the optical disk without placing the optical disk in the record end state and without forming the visual image when the user does not instruct that the optical disk should be made unable to additionally record information.

2. A non-transitory computer-readable storage medium storing a program designed for use in an optical recording apparatus which performs an optical writing process of irradiating a laser beam onto a surface of an optical disk to form pits for recording information, the program being executable by the optical recording apparatus to carry out a method of forming a visual image having a specified shape on a surface of an optical disk by using the optical writing process, wherein the method comprises the steps of:

checking a recording state of an optical disk to determine whether or not the optical disk is capable of additionally recording information;

prompting a user on a display to instruct whether or not the optical disk should be made unable to additionally record information in case that the optical disk is determined to be capable of additionally recording information;

placing the optical disk in a recording end state while an available area is left on the surface of the optical disk when the user instructs that the optical disk should be made unable to additionally record information on the available area any more, and subsequently forming the visual image in the available area of the optical disk by using the optical writing process; and terminating processes of the optical disk without placing the optical disk in the record end state and without forming the visual image when the user does not instruct that the optical disk should be made unable to additionally record information.

3. An optical recording apparatus comprising a mechanical drive for mounting and rotating an optical disk, an optical pickup for performing an optical writing process of irradiating a laser beam onto a surface of the optical disk to form pits for recording information, and a controller for controlling the mechanical drive and the optical pickup to carry out a method of forming a visual image having a specified shape on a surface of an optical disk by using the optical writing process, wherein the method comprises the steps of:

checking a recording state of an optical disk to determine whether or not the optical disk is capable of additionally recording information;

prompting a user on a display to instruct whether or not the optical disk should be made unable to additionally record information in case that the optical disk is determined to be capable of additionally recording information;

placing the optical disk in a recording end state while an available area is left on the surface of the optical disk when the user instructs that the optical disk should be made unable to additionally record information on the available area any more, and subsequently forming the visual image in the available area of the optical disk by using the optical writing process; and terminating processes of the optical disk without placing the optical disk in the record end state and without forming the visual image when the user does not instruct that the optical disk should be made unable to additionally record information.

4. An optical disk produced by a method of forming a visual image having a specified shape on a surface of the optical disk by using an optical writing process of irradiating a laser beam onto the surface of the optical disk to form pits, the optical disk being capable of recording information on the surface thereof by the optical writing process, wherein the method comprises the steps of:

checking a recording state of an optical disk to determine whether or not the optical disk is capable of additionally recording information;

prompting a user on a display to instruct whether or not the optical disk should be made unable to additionally record information in case that the optical disk is determined to be capable of additionally recording information;

placing the optical disk in a recording end state while an available area is left on the surface of the optical disk when the user instructs that the optical disk should be made unable to additionally record information on the available area any more, and subsequently forming the visual image in the available area of the optical disk by using the optical writing process; and terminating processes of the optical disk without placing the optical disk in the record end state and without forming the visual image when the user does not instruct that the optical disk should be made unable to additionally record information.

* * * * *